(12) United States Patent
King et al.

(10) Patent No.: US 9,196,956 B2
(45) Date of Patent: Nov. 24, 2015

(54) HYBRID CABLING SYSTEM AND NETWORK FOR IN-BUILDING WIRELESS APPLICATIONS

(75) Inventors: Stephen C. King, Lakeway, TX (US); Curtis L. Shoemaker, Round Rock, TX (US); Stephen Paul LeBlanc, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 402 days.

(21) Appl. No.: 13/805,369

(22) PCT Filed: Jun. 1, 2011

(86) PCT No.: PCT/US2011/038666
§ 371 (c)(1),
(2), (4) Date: Dec. 19, 2012

(87) PCT Pub. No.: WO2011/162918
PCT Pub. Date: Dec. 29, 2011

(65) Prior Publication Data
US 2013/0088407 A1     Apr. 11, 2013

Related U.S. Application Data

(60) Provisional application No. 61/357,810, filed on Jun. 23, 2010.

(51) Int. Cl.
*H01Q 1/50*     (2006.01)
*H04B 10/2575*  (2013.01)

(52) U.S. Cl.
CPC ........... *H01Q 1/50* (2013.01); *H04B 10/25758* (2013.01)

(58) Field of Classification Search
CPC . H01Q 1/50; H01Q 13/203; H04B 10/25758; H02G 3/04
USPC ............. 343/905, 850; 174/480, 107, 135, 95
See application file for complete search history.

(56) References Cited

U.S. PATENT DOCUMENTS

| | | | |
|---|---|---|---|
| 5,046,815 A * | 9/1991 | Cain et al. ...................... | 385/101 |
| 5,473,336 A * | 12/1995 | Harman et al. ............... | 343/790 |
| 5,664,002 A | 9/1997 | Skinner, Sr. | |
| 5,915,980 A * | 6/1999 | Baldock ........................ | 439/120 |
| 6,337,754 B1 | 1/2002 | Imajo | |
| 6,359,714 B1 | 3/2002 | Imajo | |
| 7,310,430 B1 * | 12/2007 | Mallya et al. .................. | 382/101 |
| 2003/0045284 A1 | 3/2003 | Copley | |
| 2003/0154497 A1 * | 8/2003 | Masuda et al. ................ | 725/129 |

FOREIGN PATENT DOCUMENTS

| | | | | |
|---|---|---|---|---|
| BE | EP 1 739 789 A1 * | 2/2006 | ............. | H01Q 13/20 |
| GB | 2 040 544 A * | 8/1980 | ............... | H01B 7/00 |

(Continued)

*Primary Examiner* — Hoang V Nguyen
(74) *Attorney, Agent, or Firm* — Gregg H. Rosenblatt

(57) ABSTRACT

A hybrid network for in-building wireless (IBW) applications that provides a forward link path and a reverse link path, each on separate media. In particular, a hybrid cabling system for providing wireless coverage in a building comprises a forward link comprising at least one optical fiber to couple a first signal generated at an RF input bank with an RF antenna node, and a reverse link comprising coaxial cable, wherein a portion of the reverse link includes radiating coaxial cable configured to receive a second signal transmitted by a wireless user equipment in the building and pass the second signal to the RF input bank.

16 Claims, 7 Drawing Sheets

(56) References Cited

FOREIGN PATENT DOCUMENTS

| WO | WO 00/64060 | 10/2000 |
|---|---|---|
| WO | WO 2007/064238 | 6/2007 |
| WO | WO 2010/148165 | 12/2010 |
| WO | WO 2011/129972 | 10/2011 |
| WO | WO 2011/162916 | 12/2011 |
| WO | WO 2011/162917 | 12/2011 |

* cited by examiner

HYBRID CABLING SYSTEM AND NETWORK FOR IN-BUILDING WIRELESS APPLICATIONS

BACKGROUND OF THE INVENTION

1. Field of the Invention

The present invention is directed to a hybrid cabling system and network for in-building wireless (IBW) applications.

2. Background

The continuing expansion of wireless communication and its accompanying wireless technology will require many more "cell sites" than currently deployed. This expansion has been estimated from a doubling to a ten-fold increase in the current number of cell sites, particularly in the deployment of 4G/LTE. This dramatic increase in the number of cell sites is due, in large part, to the high bandwidth demand for wireless applications and the bandwidth to the cell site must be shared to the available UE (user equipment) within range of the site.

Better wireless communication coverage is needed in order to get the bandwidth to the increasing number of customers that demand it. Thus, in addition to new deployments for traditional, large "macro" cell sites, there is an increasing need in the expansion of "micro" cell sites (sites within structures, such as office buildings, schools, hospitals, and residential units). In-Building Wireless (IBW) Distributed Antenna Systems (DASs) are utilized to improve wireless coverage within buildings and related structures. Conventional DAS uses strategically placed antennas or leaky coax throughout a building to accommodate radio frequency (RF) signals in the 300 MHz to 6 GHz frequency range. Conventional RF technologies include TDMA, CDMA, WCDMA, GSM, UMTS, PCS/cellular, iDEN, WiFi, and many others.

Outside the United States, carriers are required by law in some countries to extend coverage inside buildings. In the United States, bandwidth demands and safety concerns will drive IBW applications, particularly as the world moves to current 4G architectures and beyond.

There are a number of network architectures for distributing wireless communications inside a building that are known. These include choices of passive, analog/amplified RF, RoF (Radio over Fiber, also known as RFoG, or RF over glass), and fiber backhaul to pico and femto cells. There are hybrids of these architectures also, such as an RoF vertical or riser distribution with an extensive passive coaxial distribution from a remote unit to the rest of the horizontal cabling (within a floor, for example).

Active architectures generally include manipulated RF signals carried over fiber optic cables to remote electronic devices which reconstitute the electrical signal and transmit/receive the signal. Passive architectures include components to radiate and receive signals, usually through a punctured shield 'leaky coax' network. Hybrid architectures include native RF signal carried optically to active signal distribution points which then feed multiple coaxial cables terminating in multiple transmit/receive antennas. These conventional architectures can have limitations in terms of electronic complexity and expense, inability to easily add services, inability to support all combinations of services, distance limitations, or cumbersome installation requirements.

Conventional cabling for IBW applications includes RADIAFLEX™ cabling available from RFS (www.rfs-world.com), standard ½ inch coax for horizontal cabling, ⅞ inch coax for riser cabling, as well as, standard optical fiber cabling for riser and horizontal distribution.

Also, physical and aesthetic challenges exist in providing IBW cabling for different wireless network architectures, especially for older buildings and structures. These challenges include gaining building access, limited distribution space in riser closets, and space for cable routing and management.

SUMMARY

According to an exemplary aspect of the present invention, a hybrid cabling system for providing wireless coverage in a building comprises a forward link comprising at least one optical fiber to couple a first signal generated at an RF input bank with an RF antenna node, and a reverse link comprising coaxial cable, wherein a portion of the reverse link includes radiating coaxial cable configured to receive a second signal transmitted by a wireless user equipment in the building and pass the second signal to the RF input bank.

In another aspect, the reverse link conducts power to the RF antenna node. In a further aspect, the reverse link conducts power to the RF antenna node via a center conductor of the radiating coaxial cable.

In another aspect, the hybrid cabling system further comprises a converter to convert the forward link signal from an optical signal to an electrical signal to be transmitted by a radio frequency antenna of the RF antenna node.

In another aspect, the hybrid cabling system further comprises an adhesive-backed multi-channel RF signal cable, comprising a main body having at least multiple bores formed lengthwise throughout, and a flange portion having an adhesive backing layer to mount the cable to a mounting surface. In a further aspect, the reverse link is disposed in a first bore and the forward link is disposed in a second bore. In a further aspect, the radial position of the radiating coaxial cable is maintained throughout the length of the RF signal cable.

In another aspect, the hybrid cabling system further comprises a low noise amplifier to provide signal gain to the reverse link only.

In another aspect, the hybrid cabling system further comprises a splitter to split the optical forward link signal into multiple optical forward link signals.

In another aspect, the hybrid cabling system further comprises a summing junction coupled to the forward and reverse links to sum the reverse link feed with the forward link feed for transmission back into the RF input bank.

In another aspect, DC or low frequency AC power is coupled from a power supply to the reverse link via a bias tee.

In another aspect, the hybrid cabling system further comprises a passive bi-directional signal combiner to combine signals generated at the RF input bank.

In another aspect, the adhesive-backed multi-channel RF signal cable is adhesively mountable to a building wall at a position just below a ceiling.

In another aspect, the radiating coaxial cable comprises an in-field, programmable RF radiating channel.

In another aspect, the radiating coaxial cable comprises a plurality of radiating apertures formed longitudinally along the axial length of the radiating coaxial cable. In a further aspect, the plurality of radiating apertures are formed along the axial length of the radiating coaxial cable in a random pattern.

In another aspect, the radiating coaxial cable comprises a longitudinal slot formed in outer shielding of the radiating coaxial cable along the axial length of the radiating coaxial cable. In a further aspect, the longitudinal slot has an opening from about 20 degrees to about 55 degrees to provide a reception field that covers a substantial portion of a room or hallway.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
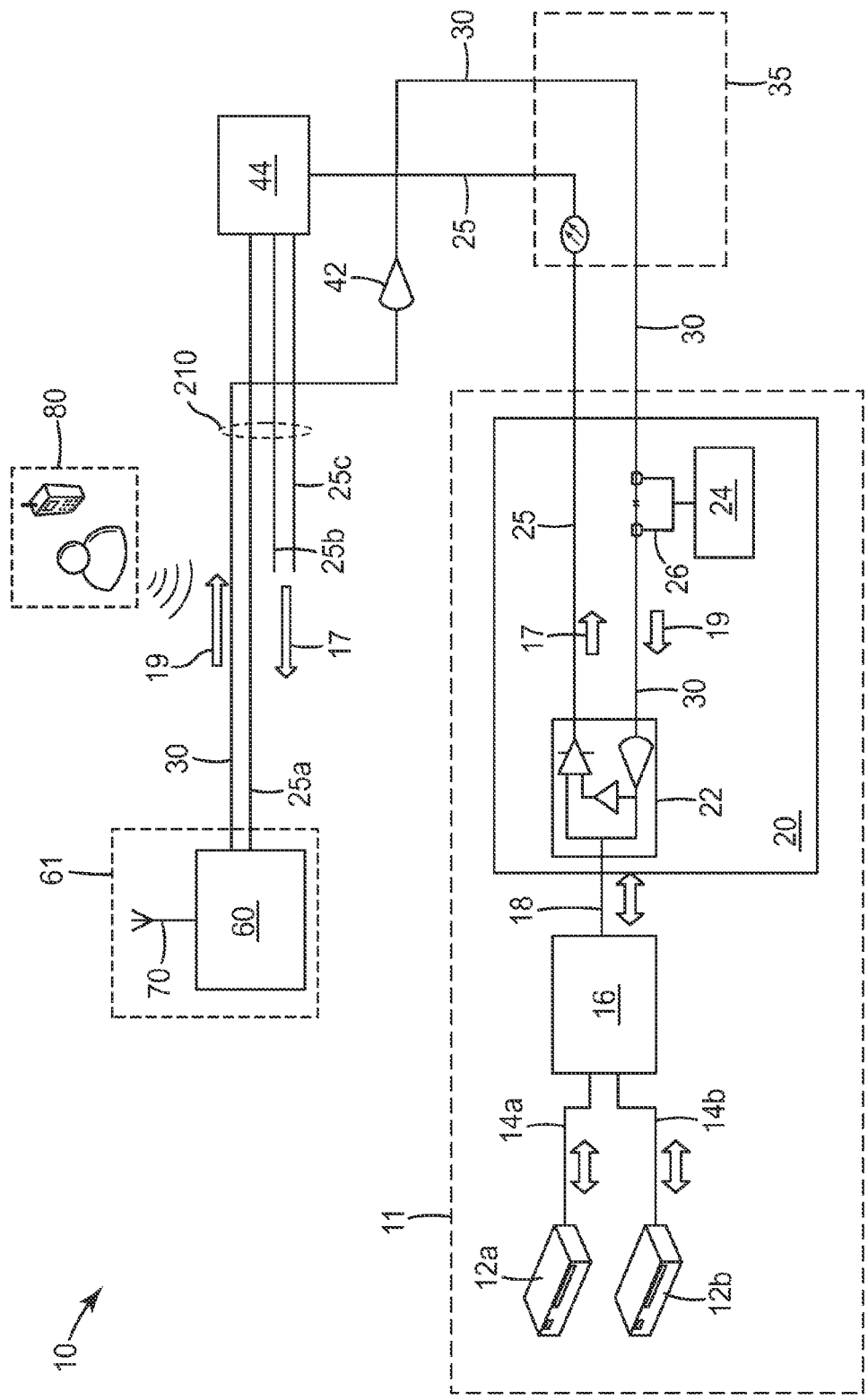
FIG. 1 is a schematic view of a hybrid RF signal network in accordance with an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a hybrid cabling system and network for in-building wireless (IBW) applications. In particular, the hybrid network described herein provides a forward link path and a reverse link path, each on separate media. For example, adhesive-backed, low profile polymeric or laminated metallic horizontal cabling can be utilized for straightforward installation and better aesthetics as the separate reverse and forward links can be installed using the same cabling. The adhesive-backed cabling can provide one or more radiating channels for radiating the RF/cellular signal without the use of separate antennas. The separate forward link path can comprise optical fibers to provide RoF, thereby enabling low RF signal loss distribution. In this manner, gain can be provided in the reverse link without feedback effects. Moreover, remote power can be delivered on the reverse link to a forward link multi-service transmit antenna. In addition, the reverse link path can utilize smaller diameter coax for significant cost savings, ease of installation, and aesthetic appeal. Thus, the hybrid architecture provides for separate forward link and reverse link budgets.

An exemplary hybrid network 10 for in-building wireless (IBW) applications is shown in FIG. 1. In this exemplary aspect, the forward link RF signal pathways comprise optical fibers and the reverse link pathways comprise a coaxial (coax) cable construction, wherein at least a portion of the reverse link includes radiating coax.

As shown in FIG. 1, an RF input bank comprising one or more RF transceivers 12a, 12b, such as cellular base transceiver stations (BTS), eNodeB's, microcells, repeaters or bi-directional amplifiers, Fire/Life/Safety systems, etc., is located in a telecom equipment room 11 or similar location in a building. The RF transceivers output an RF modulated electrical signal that is to be transmitted on antennae and broadcast. The signals from the transceivers 12a, 12b are guided on RF pathways 14a, 14b, which are preferably conventional coax cables. These signals can be combined into a single RF signal cable 18 via a passive bi-directional signal combiner 16. In one aspect, the passive bi-directional signal combiner 16 may incorporate some frequency band management if needed to ensure adequate separation between the applied service spectra. The combiner 16 also can be useful in mitigating passive inter-modulation distortion in a multi-service system by filtering out spurious mixing components from the presence of multiple frequencies.

The forward link direction (see arrow 17) corresponds to signals originating at the RF input bank and directed to the customer User Equipment (UE). The forward link signals are buffered/amplified by a driver/amplifier 22 to a level where it can be easily used to modulate an optical signal. In a preferred aspect, driver/amplifier 22 can also be utilized as a summing junction, as explained further below. The optical signal is guided on optical fiber 25, which can comprise a single mode optical fiber optimized to carry RoF. Alternatively, optical fiber 25 can be a multi-mode optical fiber. This RF modulated optical signal contains all of the spectral information (e.g., signaling protocols, information, etc., necessary to complete mobile messaging or telemetry transmission) of the combined forward link signals. Since the optical signal experiences very little loss over the relatively short distances found in most buildings, gain in the forward link direction is not necessary.

Optionally, the forward link optical signal can be applied to a building riser cable 35 (e.g., for a multi-story building) via multiple fiber optic cables. In the embodiment of FIG. 1, one fiber is provided to each floor. At each floor, the forward link signal can be guided via fiber 25 to a 1×n optical power splitter 44 located on that particular floor. The RF optical signal can be split via a conventional optical splitter 44 and connected to 'n' optical fibers (in this example, 3 fibers, 25a-25c, are shown), where the number of optical fibers corresponds to the number of antenna nodes needed for this building floor. For example, implementations may include 4 optical fibers, 6 optical fibers, or 12 optical fibers, depending on the building configuration. In addition, the forward link can include both optical fibers and coax cables.

In a preferred aspect, the optical fibers 25a-25c are provided in an adhesive-backed horizontal cable, such as cable 210, explained in further detail below with respect to FIG. 2. In one aspect, the fibers 25a-25c are contained in cable 210, which is mounted onto the interior walls of the building, such as on hallways or room walls. At each desired antenna node 61, an optical fiber (e.g., fiber 25a) can be coupled to an optical-to-RF converter 60, such as a conventional photodiode, that can further include a low noise amplifier (LNA). The converter 60 can be used to drive a multi-service transmit antenna 70, which may be a single antenna. In this aspect, antenna 70 provides the forward link path only. The remaining fibers (e.g., fibers 25b-25c) are further routed to additional antenna nodes (antennae, converters, (optional) amplifiers) that may be distributed throughout the building.

Figure 2:
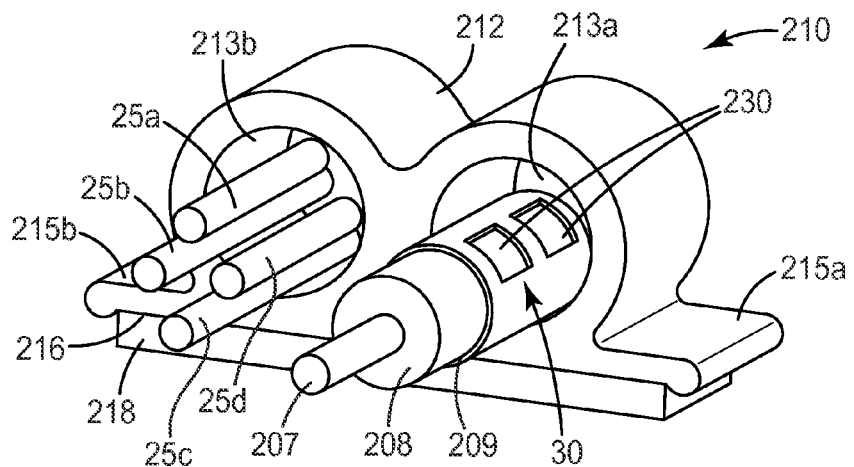
FIG. 2 is an isometric section view of an exemplary adhesive-backed multi-channel cable according to another aspect of the present invention.

In this exemplary hybrid network 10, the reverse link path 19 can be provided by a small, flexible coaxial cable 30, which can also be included in adhesive-backed horizontal cabling 210 (see e.g., FIG. 2). The coaxial cable 30 has a center conductor 207 surrounded by a dielectric material 208 that is surrounded by an outer conductor shield 209. The center conductor can be a conventional metal wire such as copper. In some applications, such as for microwave coax applications, the center conductor can comprise an aluminum wire with copper plating. The dielectric material can be a conventional dielectric material such as a foam dielectric that entrains a substantial amount of air to provide a low loss dielectric. The outer conductor shield can be a perforated metal (foil) or metal foil in combination with a vacuum deposited metal on the dielectric material. Such a waveguide structure can provide low skin effect losses and good RF ground. In a preferred aspect, coax cable channels are configured to provide for reception of radio frequency (RF) signals, having a frequency range of from about 300 MHz to about 6 GHz.

Figure 5A:
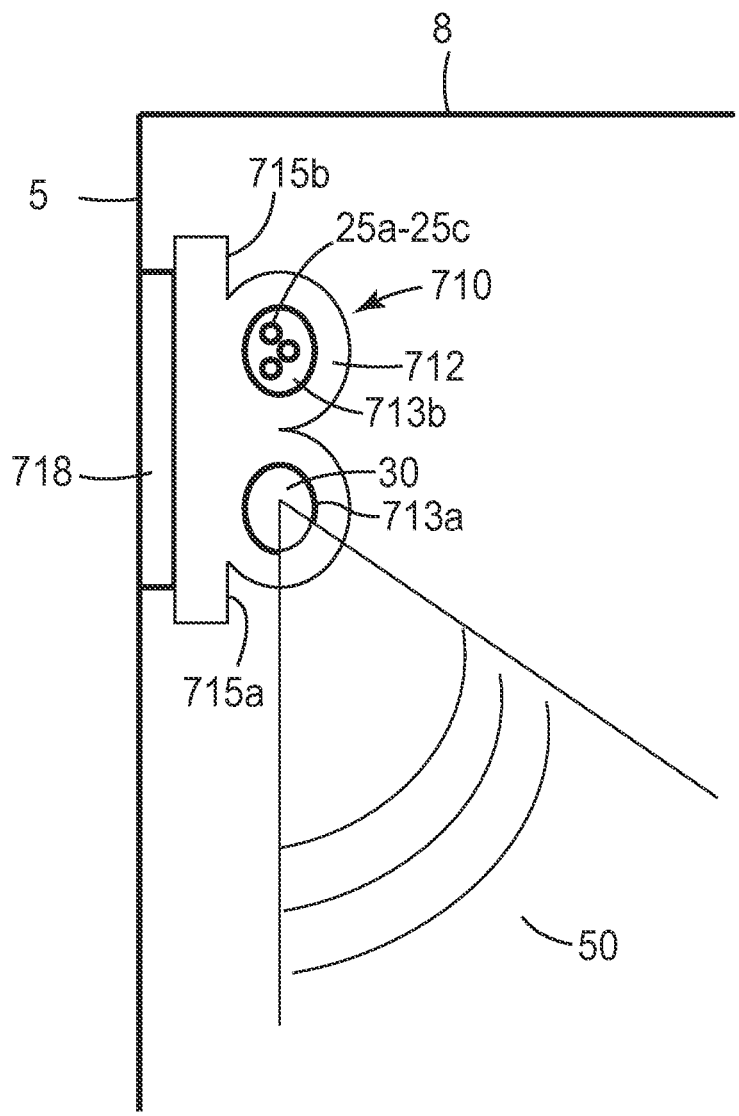
FIG. 5A is a schematic view of an exemplary adhesive-backed multi-channel cable mounted on a wall in accordance with another aspect of the invention.

In one aspect of the present invention, the reverse link comprises cable 30 itself, which can be configured as a radiating coax cable. Similar to a conventional 'leaky coaxial' cable, cable 30 can receive RF reverse link signals all along or at designated areas of horizontal cabling 210. Exemplary radiating coax configurations are shown with reference to FIGS. 3A-3C, described in further detail below. Thus, RF signals sent from UE 80, such as handheld devices, cell phones, laptops, etc., can be received by horizontal cabling 210, which can be distributed throughout the hallways and rooms of the building (an example configuration is shown in FIG. 5a, described below).

RF ingress of the forward link signal back into the reverse link path can be limited by the application of metal tape (described below) to seal off ingress points near forward link antenna nodes (e.g., antenna 70).

The reverse link path 19 can optionally include a low noise amplifier (LNA), such as LNA 42 shown in FIG. 1 to increase the signal strength. This gain-boosting can be provided on each floor, if needed. This configuration can improve the signal-to-noise ratio of the reverse link path 19. Optionally, the distribution coaxial cable in each floor can be combined into a larger diameter (lower loss) coaxial riser cable 35 or distributed separately and combined at the equipment room 11. The combined reverse link feeds can then be summed at amplifier/summing junction 22 with the forward link feed from the transceiver 12a, 12b for transmission back into the RF input bank. In this aspect, the amplifier/summing junction 22 includes a negative summing junction for the reverse link into the forward link buffer. This component can ensure that the reverse link is not re-radiated into the forward link path.

In a further aspect of this invention, the coaxial core of cable 30 can also provide power to the transmit antenna 70 (e.g., to power the driver amplifier of the antenna 70 via DC or low frequency AC energy applied to the core and propagated through the system). The power requirements are modest, e.g., about 1 W to 2 W, in an exemplary aspect. For example, as shown in FIG. 1, a power supply 24 can couple power to coax cable 30 via a conventional power coupler such as, e.g., a bias tee 26. In addition, any access point in the network can draw power from the energized core via a tap (not shown), which can provide very low impedance to DC or low frequency AC but very high impedance to RF energy. For example, the distributed LNA's, such as LNA 42, can be powered in this manner.

Thus, the hybrid network described herein provides a forward link path and a reverse link path, each on separate media. The separate forward link path can comprise optical fibers to provide RoF, thereby enabling low RF signal loss distribution. In this manner, gain can be provided in the reverse link without feedback effects. Moreover, remote power can be delivered on the reverse link to the transmit antenna.

In addition, as mentioned above, an adhesive-backed horizontal cabling can utilized to provide convenient installation of the forward and reverse links on each floor of the building. In an exemplary aspect, an adhesive-backed cabling duct 210 accommodates one or more RF signal channels to provide horizontal cabling for IBW applications.

As shown in FIG. 2, an adhesive-backed duct 210 accommodates multiple RF signal channels. Exemplary adhesive-backed ducts are described in U.S. Application Nos. 61/357,783 and 61/357,793, incorporated by reference herein in their entirety.

Duct 210 includes a main body 212 having multiple conduits, here bores 213a and 213b, provided longitudinally throughout. The bores 213a and 213b are each sized to accommodate one or more RF communication lines disposed therein. In this example, bore 213a is sized to accommodate a first RF signal channel 30 and bore 213b is sized to accommodate multiple additional RF signal channels 25a-25d. In this aspect, first RF signal channel 30 comprises a coax cable, having a conducting core 207 surrounded by a dielectric material 208 that is surrounded by an outer conductor shield 209. In addition, RF signal channel 30 can include one or more radiating apertures 230 that are cut through the secondary outer shield. Further description regarding radiating apertures is provided below.

RF signal channels 25a-25d each comprise an optical fiber optimized for carrying RFoG. For example, the optical fibers can comprise single mode optical fibers designed to transport native RF signals. Multi-mode fibers can also be utilized in some applications. As mentioned above, in one aspect, RF signal channel 30 can comprise a radiating coax cable. In further alternative aspects, bore 213a can be sized to accommodate additional RF signal channels and bore 213b can be configured to accommodate a greater or fewer number of RF signal channels. In another alternative aspect, the adhesive-backed cabling can further include one of more communication channels configured as CAT5, CAT6 lines. In a further alternative, the adhesive-backed cabling can further include dedicated power feeds.

Duct 210 can be a structure formed from a polymeric material, such as a polyolefin, a polyurethane, a polyvinyl chloride (PVC), or the like. For example, in one aspect, duct 210 can comprise an exemplary material such as a polyurethane elastomer, e.g., Elastollan 1185A10FHF (available from BASF, Florham Park, N.J.). Additives, such as flame retardants, stabilizers, and fillers can also be incorporated as required for a particular application. In a preferred aspect, duct 210 is flexible, so that it can be guided and bent around corners and other structures without cracking or splitting. Duct 210 can be continuously formed using a conventional extrusion process.

In an alternative aspect, duct 210 can be formed from a metallic material, such as copper or aluminum. In one aspect, the metallic material may be pre-laminated with a polymer film, such as a liquid crystal polymer or thermoplastic material, having a relatively thin thickness (e.g., up to 2 mils), that forms an outer skin or shell around the main body of the duct. This outer skin can help prevent moisture from penetrating the duct and can also be used as a decorative cover.

In a further aspect, the duct 210 can be directly extruded over the communications lines in an over jacket extrusion process.

Duct 210 also includes a flange or similar flattened portion to provide support for the duct 210 as it is installed on or mounted to a wall or other mounting surface, such as a floor, ceiling, or molding. In a preferred aspect, the flange 215a, 215b includes a rear or bottom surface 216 that has a generally flat surface shape. Optionally, duct 210 can include one or more strength members, such as an aramid string or thread (e.g., a woven or non-woven Kevlar material) that is twisted or aramid yarn. The aramid string or aramid yarn can be bonded or un-bonded. Alternative strength member materials include metallic wire or a fiberglass member.

In a preferred aspect, an adhesive layer 218 comprises an adhesive, such as an epoxy, transfer adhesive or double-sided tape, disposed on all or at least part of surface 216. In one aspect, adhesive layer 218 comprises a factory applied 3M VHB 4941F adhesive tape (available from 3M Company, St. Paul Minn.). In another aspect, adhesive layer 218 comprises a removable adhesive, such as a stretch release adhesive. By "removable adhesive" it is meant that the duct 210 can be mounted to a mounting surface (preferably, a generally flat surface, although some surface texture and/or curvature are contemplated) so that the duct 210 remains in its mounted state until acted upon by an installer/user to remove the duct from its mounted position. Even though the duct is removable, the adhesive is suitable for those applications where the user intends for the duct to remain in place for an extended period of time. Suitable removable adhesives are described in more detail in PCT Patent Appl. No. PCT/US2011/029715, incorporated by reference herein in its entirety.

In one alternative aspect, the adhesive backing layer 218 includes a removable liner (not shown) that can be removed so that the adhesive layer can be applied to a mounting surface.

Thus, the adhesive-backed horizontal cabling of FIG. 2 can provide a separate reverse link, via coax cable 30, and a separate forward link, where each RF signal channel 25a-25d provides the combined forward link to a particular antenna node.

Figure 3A:
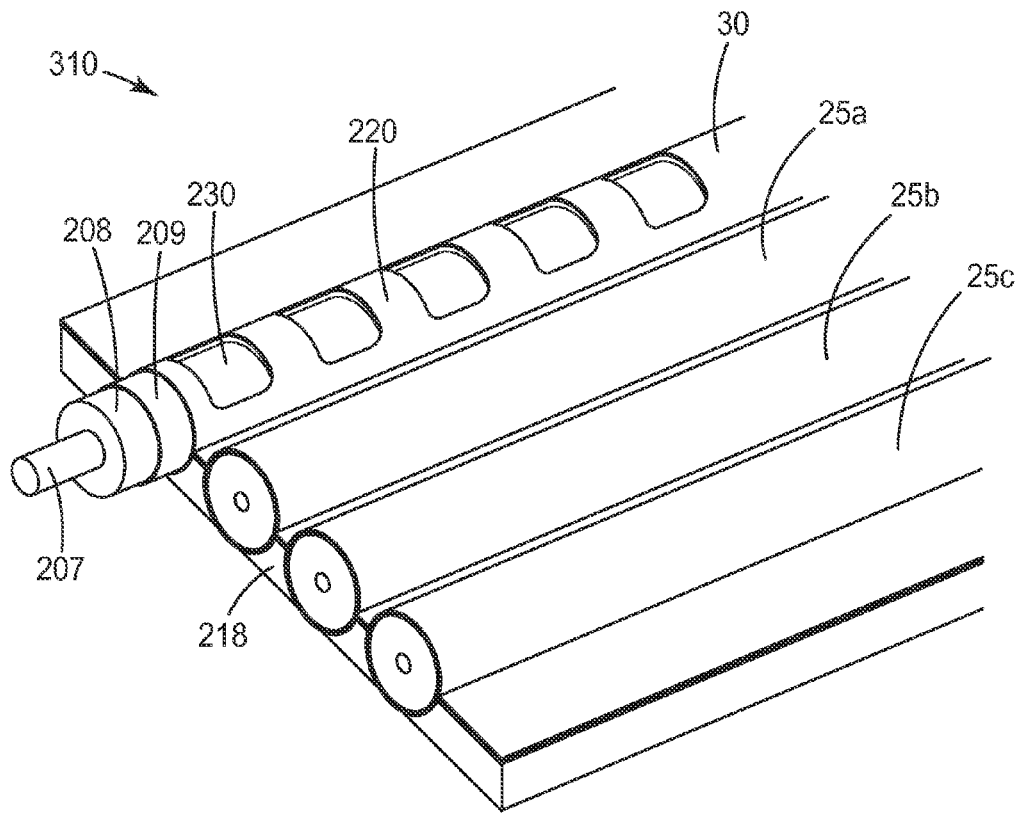
FIGS. 3A-3D are isometric views of alternative adhesive-backed multi-channel cables according to other aspects of the present invention.

In another aspect, the adhesive-backed horizontal cabling can be configured as a laminated multi-channel (LMC) cable that can be utilized to provide multi-channel RF signal distribution. As shown in FIG. 3A, LMC cable 310 includes multiple channels 30, and 25a-25c, each including a communication line. Of course, as will be apparent to one of ordinary skill in the art given the present description, LMC cable 310 can include a fewer or greater number of communication line channels (e.g., two channels, three channels, five channels, six channels, etc.).

In one aspect, channel 30 comprises a coaxial cable, having a center conductor 207 surrounded by a dielectric material 208 that is surrounded by an outer conductor shield 209. The center conductor 207 can be a conventional metal wire such as copper, or the alternatives described above. The dielectric material 208 can be a conventional dielectric material such as a foam dielectric that entrains a substantial amount of air to provide a low loss dielectric. The outer conductor shield 209 is a conventional metal (foil) or metal foil in combination with a vacuum deposited metal on the dielectric material.

A metallic secondary outer sheath 220 can be laminated over each of the channels to provide a single cable assembly structure. The metallic secondary outer sheath 220 can be formed from a metal, such as copper or aluminum, having a thickness of about 0.001" to about 0.015".

Outer sheath 220 can be laminated onto the signal channels using a lamination process, such as a roll-to-roll process, where two outer sheath layers 220 are bonded onto the signal channels. Bonding can be accomplished using a thermoplastic liner, a hot-melt in selective locations, or another conventional process. In one aspect, a lamination process such as is described in U.S. Pat. Appl. No. 61/218,739, incorporated by reference herein in its entirety, can be utilized.

The metallic outer sheath 220 is fire retardant and can provide heat dissipation. Moreover, the outer sheath 220 can provide a common RF ground. The metallic outer sheath 220 also provides for mechanical stability during installation. Although this exemplary embodiment describes a lamination process as forming LMC cable 310, cable 310 can also be constructed using alternative processes, such as resistance welding the top and bottom outer metallic layers between the signal channels and/or along the periphery.

An adhesive backing layer 218 is provided on one side of cable 310 to help mount LMC cable 310 to a standard mounting surface, such as a wall, ceiling, floor, or molding. The adhesive backing layer 218 comprises an adhesive, such as an acrylic, pressure sensitive adhesive, or one of the other adhesives described above.

Optionally, LMC cable 310 can further include a very thin (e.g., up to 2 mils thickness) outer skin formed from a low dielectric material to cover the outer perimeter of the cable. This low dielectric material outer skin can prevent moisture from penetrating the foamed dielectric in each coax channel where radiating apertures have been made in the outer shield. The low dielectric material outer skin can also be used as a decorative cover. Alternatively, in areas in which radiating structures are created with apertures in the outer metallic shield, an exemplary sealing material comprises a Novec fluid, such as EGC-1700 or EGC-2702, which provides a hydrophobic coating to seal radiating apertures.

Cable 310 can have a low profile, generally flat construction and can be used for a variety of IBW horizontal cabling applications.

In one aspect, channel 30 is a dedicated radiating channel which receives a cellular communications signal via an arrangement of one or more radiating apertures 230 that are cut through the secondary outer sheath 220 and the outer conductor shield 209. The apertures can comprise a repeating periodic structure of apertures 230 formed to have a specific axial length and transverse width and axially spaced down the length of the signal channel. When such apertures have a regular spacing and size, the impedance mismatch between open areas and covered areas can produce a tuning effect. In an alternative aspect, as provided in more detail below, apertures 230 can be provided in a non-periodic, or even random, configuration along the length of channel 30.

Figure 3B:
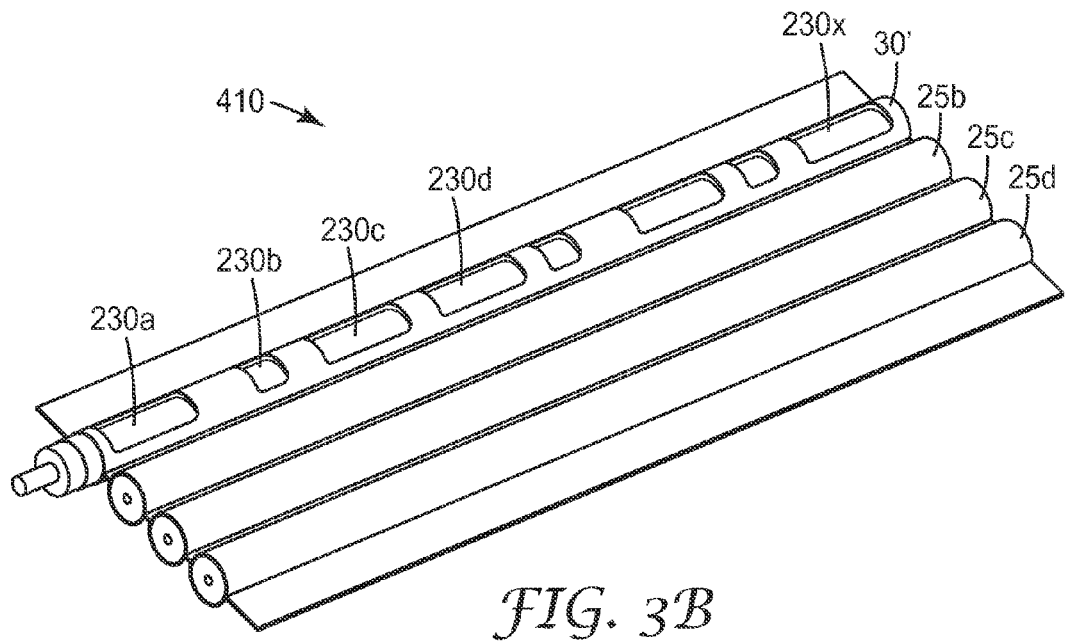
Figure 3C:
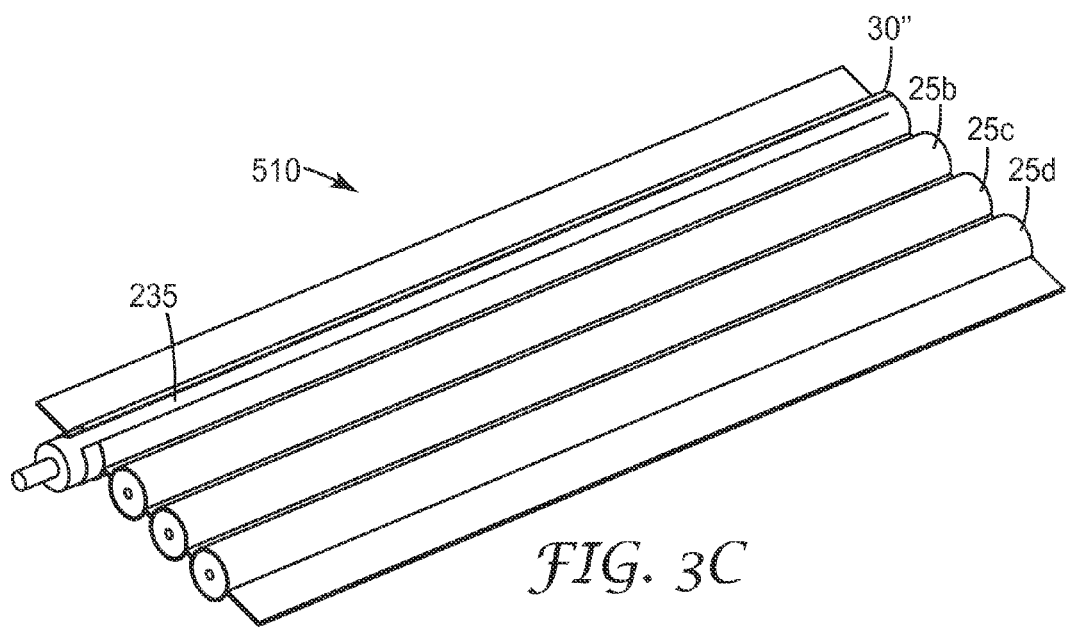
Figure 3D:
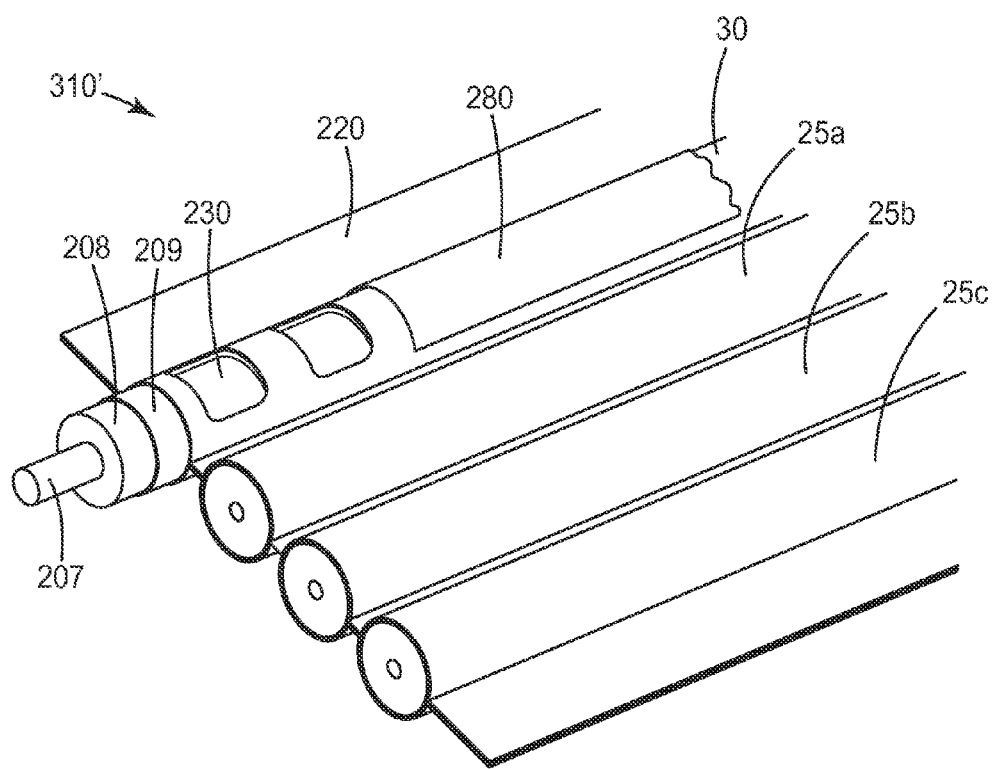

Unlike traditional leaky coax, channel 30 can be custom designed so that radiating portions of the channel are limited to selected areas. For example, the incorporation of metallic tape over some of the radiating apertures 230 allows for preserving the signal level between the transmitter source and the place where the signal is to be radiated. As shown in FIG. 3D, horizontal cable 310' includes metallic tape 280 that can be placed over a portion of the first channel 30. Metallic tape 280 can be a copper foil with a very thin layer of adhesive (for maximizing the capacitive coupling to the outer metallic layer) and optionally a decorative outer layer for aesthetic purposes, typically matching the appearance of the outer metallic layer. The installer can route cable 310' through a structure and remove the factory laminated removable foil tape in areas where RF transmission into the room or area is desired. The incorporation of metallic tape allows for in-field programmable radiation location to be established, as needed for the particular installation. In addition, the selective use of the metallic tape allows for the use of smaller coax, with easier installation but higher intrinsic loss, as the radiation loss is reduced in areas where radiated signal is not needed.

In an example manufacturing process, the LMC cable 310 may enter an in-line punch station to punch radiating apertures in a given coax channel. This process may be under computer control to allow for the custom manufacture of cables per given network design. The punched shield can then be laminated into the cable structure. A copper or aluminum adhesive strip may be placed over the apertures creating a shield that may later be removed to provide in-field programmable radiation pattern.

Referring back to FIG. 3A, cable 310 further includes channels 25a-25c, each formed as an optical fiber to provide separate RF signal pathways.

One benefit of this type of cable configuration is that by having separated service pathways, the effects of passive inter-modulation (PIM, where services operating at different frequencies interact) can be reduced.

As mentioned above, the adhesive-backed cabling of the present invention can include an RF signal channel having a radiating coax construction. For example, FIG. 3A shows first channel 30 as having radiating apertures 230 that can be spaced at regular intervals. As mentioned above, when the apertures have a regular spacing and size, the impedance mismatch between open areas and foil covered areas can produce a tuning effect. This effect induces some frequency selective tuning, which can be undesirable. In some aspects, the cable configuration can allow for purposeful tuning to be introduced to filter out an unwanted frequency.

The adhesive-backed cable configuration further provides for ways for reducing or eliminating the tuning effects to provide for broad band performance. In one alternative aspect, radiating apertures can be formed via a "random" punching geometry. During formation, the cable can be passed through a computer controlled in-line punch, in which a pre-selected random sequence (within specified minimum and maximum spacing) is used to drive the computer controlled punch. For example, FIG. 3B shows an alternative cable 410 having a first channel 30' with a set of radiating apertures 230a-230x randomly spaced along the axial length of the channel. Each of the apertures 230a, 230b, 230c, 230d, etc. can have a different shape (length and width) and each of the apertures can be separated by a different distance along the axial length of the channel 30'. An adhesive backing layer (not shown), such as those described above, can be provided on cable 410 for mounting to a general mounting surface.

In another alternative aspect, broadband performance can be obtained by including a longitudinal slot in the outer conductor/sheath of the RF signal channel. For example, as shown in FIG. 3C, an alternative cable 510 includes a first channel 30" having a slot 235 formed lengthwise in the outer sheath and conductor shield. Slot 235 has about a 20 degree to about a 55 degree opening, preferably about a 45 degree opening, along the entire axial length of channel 30", or at least a substantial portion of the axial length. This configuration changes the impedance of the transmission line (in one example, using a 45 degree slot in a channel having a construction similar to a conventional Times Microwave (Amphenol) LMR-400 coax cable, the impedance increases from 50 to 50.6 ohms). For this alternative embodiment, an outer coating or encasing material, such as the low dielectric material mentioned previously, can be used to gain additional mechanical strength. Alternatively, a low-dielectric film or tape covering over the slot may be utilized. An adhesive backing layer (not shown), such as those described above, can be provided on cable 510 for mounting to a general mounting surface.

Figure 4:
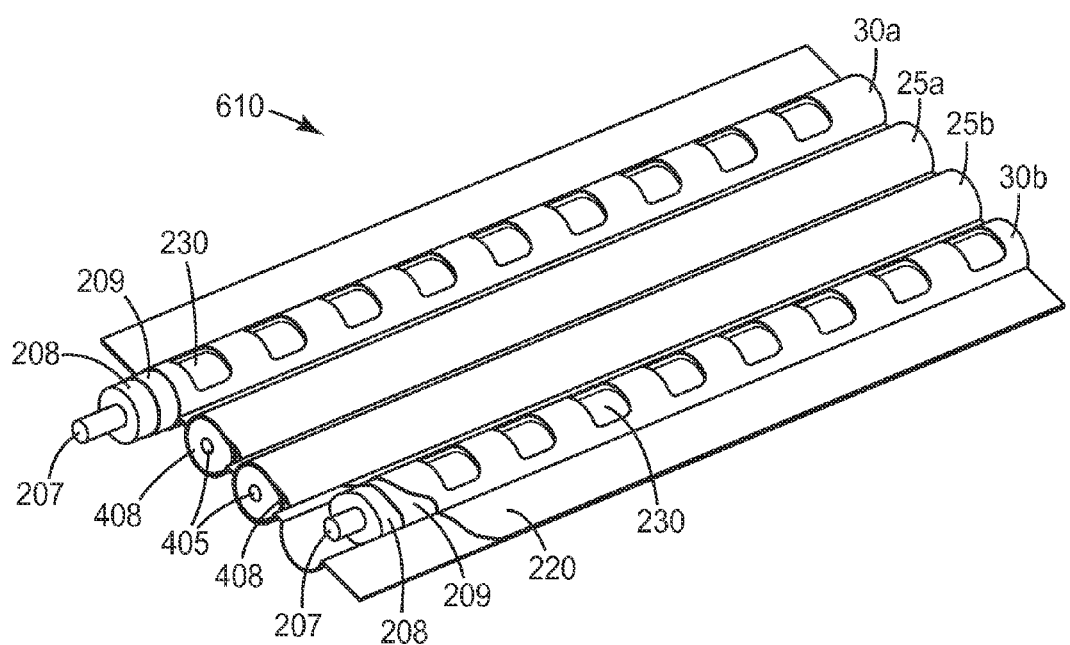
FIG. 4 is an isometric view of an exemplary adhesive-backed multi-channel cable according to another aspect of the present invention.

In another aspect, the adhesive-backed cable of the present invention can include multiple radiating channels. For example, as shown in FIG. 4, LMC cable 610 includes radiating channels 30a and 30b, each having a plurality of radiating apertures 230 formed thereon. The radiating channels 30a and 30b may utilize periodic spaced apertures or randomly spaced apertures. In this aspect, channels 30a and 30b can both be receive channels. In alternative aspects, channel 30a can be a receive channel and channel 30b can be a send channel, or channels 30a and 30b can both be receive channels, or channels 30a and 30b can both be send and receive channels.

In this configuration, the channels 30a and 30b are separated by signal channels 25a and 25b. In this aspect, channels 25a and 25b comprise optical fibers, each having a core/clad 405 surrounded by a buffer/jacket 408. An outer metallic sheath 220 can be laminated onto the cable 610, similar to that described above. Alternatively, radiating channels can be adjacent one another. In a further alternative, a plurality of radiating channels can each be separated by a non-radiating channel.

In addition, the radiating channels can each have a different aperture structure, such as the random aperture structure shown in FIG. 3B or the longitudinal slotted structure shown in FIG. 3C.

The above described adhesive-backed cable configurations can be utilized in hybrid IBW architectures. In one example implementation, as shown in FIG. 5A, an adhesive-backed cabling duct 710 can be formed similar to the dual conduit duct 210 shown above in FIG. 2 to provide a hybrid cabling solution.

Duct 710 includes a main body 712 having multiple conduits, here bores 713a and 713b, provided longitudinally throughout. Bore 713a is sized to accommodate a first RF signal channel 30, which comprises a radiating coax cable. In this aspect, bore 713a has an inner diameter that matches the outer diameter of the coax cable, thereby providing a snug fit which fixes the radial orientation of signal channel 30 during and after installation. Bore 713b is sized to accommodate multiple RF signal channels, here shown as RF signal channels 25a-25c. In this aspect, RF signal channels 25a-25c each comprise an optical fiber optimized for carrying RoF.

In this aspect, RF signal channel 30 comprises a radiating coax cable having a longitudinal slot similar to the construction of signal channel 30" shown in FIG. 3C, where a slot is formed lengthwise in the outer conductor/sheath, having about a 45 degree opening, along a substantial portion of the axial length of channel 30".

In this aspect, duct 710 is formed from a polymeric material, such as those described above, and can be directly extruded over the RF signal channels in an over-jacket extrusion process. Duct 710 also includes a flange structure 715a, 715b to provide support for the duct as it is mounted to wall 5 via an adhesive backing 718. Optionally, duct 710 can include one or more strength members, such as those described above. In a preferred aspect, an adhesive layer 718 comprises an adhesive, such as an epoxy, transfer adhesive double-sided tape, acrylic tape, or removable adhesive, such as those described above.

In this aspect, duct 710 is mounted on wall 5 at a position just below ceiling 8. As the signal channel 30 is secured in its radial orientation along the length of the duct, duct 710 faces toward the center of the room, hallway, or other location, operating as an antenna to provide suitable coverage in the room (as depicted by reception field 50) to couple reverse link signals. In addition, RF signal channels 25a-25c provide multiple, separate RF pathways that can be dedicated to different transmit antenna nodes.

Although duct 710 is shown being installed on wall 5 at a position just below the ceiling, duct 710 (or any of the adhesive-backed cables described herein) can also be installed at other heights on wall 5, on ceiling 8, on the floor of the room or hallway, or on other mounting structures, as would be apparent to one of ordinary skill in the art given the present description.

Figure 5B:
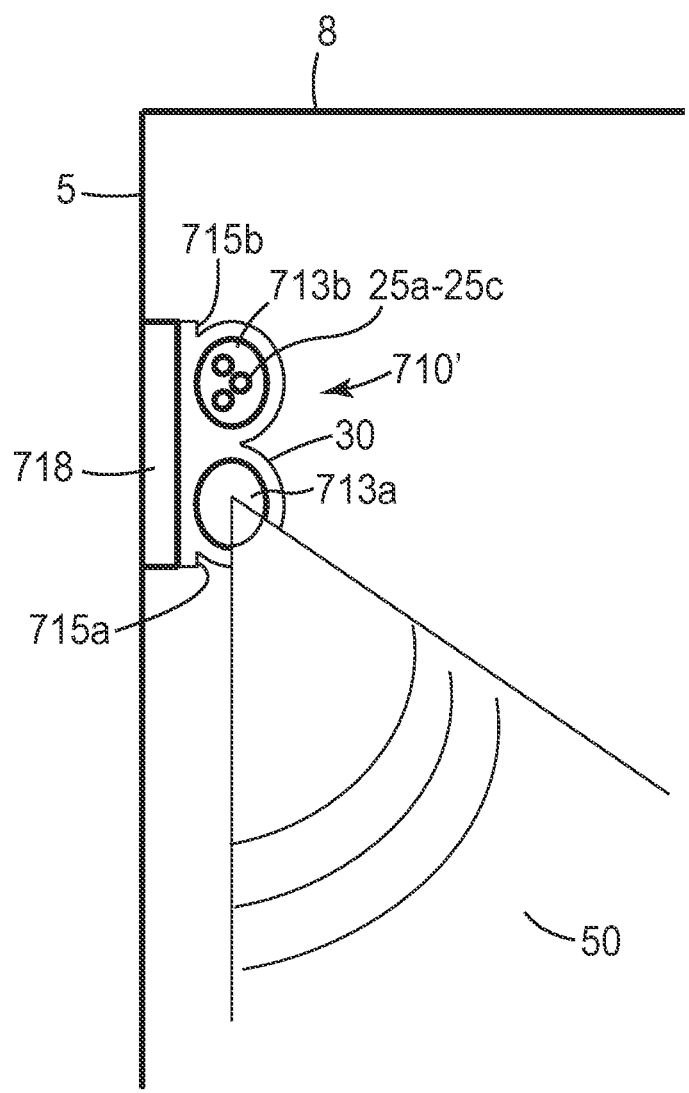
FIG. 5B is a schematic view of an exemplary adhesive-backed multi-channel cable mounted on a wall in accordance with another aspect of the invention.

In another aspect, as shown in FIG. 5B, an adhesive-backed cabling duct 710' can be formed similar to the dual conduit duct shown in FIG. 5A, but with a metallic body, to provide a hybrid cabling solution. Duct 710' includes a main body 712' having multiple conduits, here bores 713a and 713b. Bore 713a is sized to accommodate a first RF signal channel 30, which comprises a radiating coax cable. In this aspect, bore 713a has an inner diameter that matches the outer diameter of the coax cable, thereby providing a snug fit which fixes the radial orientation of signal channel 30 along the length of the duct during and after installation. Bore 713b is sized to accommodate multiple RF signal channels, here shown as channels 25a-25c. In this aspect, RF signal channels 25a-25c each comprise an optical fiber optimized for carrying RoF.

In this aspect, RF signal channel 30 comprises a radiating coax cable having a longitudinal slot similar to the construction of signal channel 30" shown in FIG. 3C, where a slot is formed lengthwise in the outer conductor/sheath, having about a 45 degree opening, along a substantial portion of the axial length of channel 30". Alternatively, RF signal channel 30 can comprise a radiating coax cable having an arrangement of randomly punched apertures formed along the length of the signal channel.

In this aspect, duct 710' is formed from a metallic material, such as copper, and includes a thin polymer laminate (not shown) as an outer skin. Duct 710' also includes a flange structure 715a, 715b to provide support for the duct as it is mounted to wall 5 via an adhesive backing 718. In a preferred aspect, adhesive layer 718 comprises an adhesive, such as an epoxy, transfer adhesive double-sided tape, acrylic adhesive, or removable adhesive, such as those described above.

Similar to the embodiment of FIG. 5A, duct 710' is mounted on wall 5 at a position just below ceiling 8. The signal channel 30 is secured in its radial orientation within bore 713a such that duct 710' provides a reception field 50 that can operate as an antenna to provide suitable coverage in a room, hallway, or other location to couple reverse link signals. In addition, duct 710' includes RF signal channels 25a-25c to provide multiple, separate RF pathways.

The hybrid network described herein provides a forward link path and a reverse link path, each on separate media. The separate forward link path can comprise optical fibers to provide RoF, thereby enabling low RF signal loss distribution. The separate reverse link path can comprise a slotted coax cable. In this manner, gain can be provided in the reverse link without feedback effects. Moreover, remote power can be delivered on the reverse link to a forward link multi-service transmit antenna node. In addition, the reverse link path can utilize smaller diameter coax for significant cost savings, ease of installation and more appealing aesthetics. Thus, the hybrid architecture provides for separate forward link and reverse link budgets.

In addition, the hybrid network solution described above can eliminate the need to employ duplexers, as the present network architecture provides separate antennas.

The hybrid network solution and adhesive-backed cabling described above can be used in buildings where there is a lack of established horizontal pathways for providing IBW coverage. In addition, for buildings with drywall ceilings and little or no access panels, the adhesive-backed cabling of the present invention can be installed without having to enter the existing drywall ceiling. The adhesive-backed cabling helps minimize or eliminate the need to disturb existing elaborate trim and hallway decorum. In addition, the need to establish major construction areas can be avoided.

The incorporation of metallic tape over selected radiating apertures allows for in-field programmable radiation location to be established, as needed for the particular installation. Also, the incorporation of metallic tape over selected radiating apertures allows for relatively small sized coax to be utilized for the multiple signal channels. This smaller product form factor can be much easier to install. Losses can be managed by sending separate signals to areas that are further from the transmitter, leaving the apertures sealed, using a separate receive coax channel, radiating power only where needed, and using amplifiers on an as-needed basis.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A hybrid cabling system for providing wireless coverage in a building, comprising:
    a forward link comprising at least one optical fiber to couple a first signal generated at an RF input bank with an RF antenna node; and
    a reverse link comprising coaxial cable, wherein a portion of the reverse link includes radiating coaxial cable configured to receive a second signal transmitted by a wireless user equipment in the building and pass the second signal to the RF input bank, wherein the reverse link conducts power to the RF antenna node via a center conductor of the radiating coaxial cable.

2. The hybrid cabling system of claim 1, further comprising a converter to convert the forward link signal from an optical signal to an electrical signal to be transmitted by a radio frequency antenna of the RF antenna node.

3. The hybrid cabling system of claim 1, further comprising an adhesive-backed multi-channel RF signal cable, comprising a main body having at least multiple bores formed lengthwise throughout, and a flange portion having an adhesive backing layer to mount the cable to a mounting surface.

4. The hybrid cabling system of claim 3, wherein the reverse link is disposed in a first bore and the forward link is disposed in a second bore.

5. The hybrid cabling system of claim 3, wherein the radial position of the radiating coaxial cable is maintained throughout the length of the RF signal cable.

6. The hybrid cabling system of claim 3, wherein the adhesive-backed multi-channel RF signal cable is adhesively mountable to a building wall at a position just below a ceiling.

7. The hybrid cabling system of claim 3, wherein the radiating coaxial cable comprises an in-field, programmable RF radiating channel.

8. The hybrid cabling system of claim 3, wherein the radiating coaxial cable comprises a plurality of radiating apertures formed longitudinally along the axial length of the radiating coaxial cable.

9. The hybrid cabling system of claim 8, wherein the plurality of radiating apertures are formed along the axial length of the radiating coaxial cable in a random pattern.

10. The hybrid cabling system of claim 1, further comprising a low noise amplifier to provide signal gain to the reverse link only.

11. The hybrid cabling system of claim 1, further comprising a splitter to split the optical forward link signal into multiple optical forward link signals.

12. The hybrid cabling system of claim 1, further comprising a summing junction coupled to the forward and reverse links to sum the reverse link feed with the forward link feed for transmission back into the RF input bank.

13. The hybrid cabling system of claim 1, where DC or low frequency AC power is coupled from a power supply to the reverse link via a bias tee.

14. The hybrid cabling system of claim 1, further comprising a passive bi-directional signal combiner to combine signals generated at the RF input bank.

15. The hybrid cabling system of claim 1, wherein the radiating coaxial cable comprises a longitudinal slot formed in outer shielding of the radiating coaxial cable along the axial length of the radiating coaxial cable.

16. The hybrid cabling system of claim 15, wherein the longitudinal slot has an opening from about 20 degrees to about 55 degrees to provide a reception field that covers a substantial portion of a room or hallway.

* * * * *